United States Patent [19]
Yakubovich et al.

[11] Patent Number: 5,517,306
[45] Date of Patent: May 14, 1996

[54] METHOD AND APPARATUS FOR MEASURING ANGULAR VELOCITY OF A TRANSPARENT OBJECT

[76] Inventors: Evsey Yakubovich, Belinskaja Str. 41/37, Nizhny Novgorod, Russian Federation, 603015; Yuri Brodsky, Usilova Str. 2/151, Nizhny Novgorod, Russian Federation, 603093

[21] Appl. No.: 260,100

[22] Filed: Jun. 15, 1994

[51] Int. Cl.$^6$ ................................................. G01B 9/02
[52] U.S. Cl. ........................ 356/351; 356/28.5; 356/364
[58] Field of Search ................................. 356/345, 350, 356/349, 351, 364, 28, 28.5

[56] References Cited

U.S. PATENT DOCUMENTS

| | | |
|---|---|---|
| 3,373,650 | 3/1968 | Killpatrick . |
| 3,584,959 | 6/1971 | Del Carlo ............................... 356/365 |
| 4,006,989 | 2/1977 | Andringa ................................ 356/350 |
| 4,817,112 | 2/1989 | Weber et al. . |
| 4,863,274 | 9/1989 | Spillman et al. ........................ 356/364 |
| 4,874,245 | 10/1989 | Spillman et al. ........................ 356/364 |
| 5,022,761 | 6/1991 | Kennedy . |

FOREIGN PATENT DOCUMENTS

| | | |
|---|---|---|
| 0100993 | 6/1983 | European Pat. Off. . |
| 0454113A2 | 4/1991 | European Pat. Off. . |
| WO86/07141 | 12/1986 | WIPO . |
| WO92/00503 | 1/1992 | WIPO . |

OTHER PUBLICATIONS

F. Aronowitz, "The Laser Gyro," *Laser Applications*, Monte Ross, Ed., vol. 1, (1971), pp. 133–176.

N. B. Baranova et al., "Can an Atom 'be Set in Rotation'?" *JETP* 77 (3), (Sep. 1993), pp. 379–381.

N. B. Baranova et al., "Coriolis Contribution to the Rotatory Ether Drag," *Proc. R. Soc. Lond.* A 368 (1979), pp. 591–592.

R. A. Bergh et al., "An Overview of Fiber–Optic Gyroscopes," IEEE, (Reprinted from *Journal of Lightwave Technology*), vol. LT–2(2), 91–107 (1984), pp. 39–55.

W. W. Chow et al., "The Ring Laser Gyro," *Reviews of Modern Physics*, vol. 57, No. i, (Jan. 1985), pp. 61–104.

C. V. Heer, "History of the Laser Gyro," *Proceedings* SPIE vol. 487 Physics of Optical Ring Gyros (1984), pp. 2–12.

C. V. Heer, "An Experiment for the Observation of the 'Coriolis–Zeeman' Effect for Photons" *Quantum Electronics*, Proc. 3rd Intl. Congress, Paris, 1963. Givet & Bloembergen, Eds. Columbia V. Press, NW. 1964. vol. 2, pp. 1305–1311.

C. V. Heer, "Resonant Frequencies of an Electromagnetic Cavity in an Accelerated System of Reference," *The Physical Review*, Second Series, vol. 134, No. 4A, 18 May 1964, pp. A799–A804.

C. V. Heer, "Interference of Electromagnetic Waves and of Matter Waves in a Nonpermanent Gravitational Field," *Bull. Am. Phys. Soc.*, 6, 58 (1961).

R. V. Jones, "Rotary 'Aether Drag'," *Proc. R. Soc. Lond.* A. 349 (1976).

J. Killpatrick, "The Laser Gyro," *IEEE Spectrum*, (Oct. 1967), pp. 44–55.

H. Lefévre, "The Fiber–Optic Gyroscope," *Library of Congress Catalog*, ISBN 0–89006–537–3 (1993) Bibliography.

M. A. Player, "On the Dragging of the Plane of Polarization of Light Propagating in a Rotating Medium," *Proc. R. Soc. Lond.* A. 349, (1976), pp. 441–445.

E. J. Post, "Interferometric Path–Length Changes Due to Motion," *Journal of the Optical Society of America*, vol. 62, No. 2 (Feb. 1972), pp. 234–239.

(List continued on next page.)

*Primary Examiner*—Samuel A. Turner
*Attorney, Agent, or Firm*—Merchant, Gould, Smith, Edell, Welter & Schmidt

[57] ABSTRACT

A method and apparatus for measuring the angular velocity of a rotating substantially transparent object about an object rotation axis. The apparatus excites an electromagnetic field in a resonator such that an electromagnetic beam propagates along the propagation axis parallel to the object rotation axis. The apparatus then detects a field component of the electromagnetic beam. The detected field component of the electromagnetic beam indicates the angular velocity of the object.

40 Claims, 13 Drawing Sheets

OTHER PUBLICATIONS

E. J. Post, "Sagnac Effect," *Reviews of Modern Physics,* vol. 39, No. 2, (Apr. 1967), pp. 475–493.

Selected Papers on "Fiber Optic Gyroscopes," *SPIE Milestone Series,* vol. MS8 (1989), Bibliography, Robert B. Smith, Editor.

E. I. Yakubovich, "Effect of Co–Rotation of Medium and Field Polarization Plane," *Nonlinear Dynamics in Optical Systems,* Optical Society of America, Technical Digest, Conference Jun. 4–8, 1990, Afton, OK.

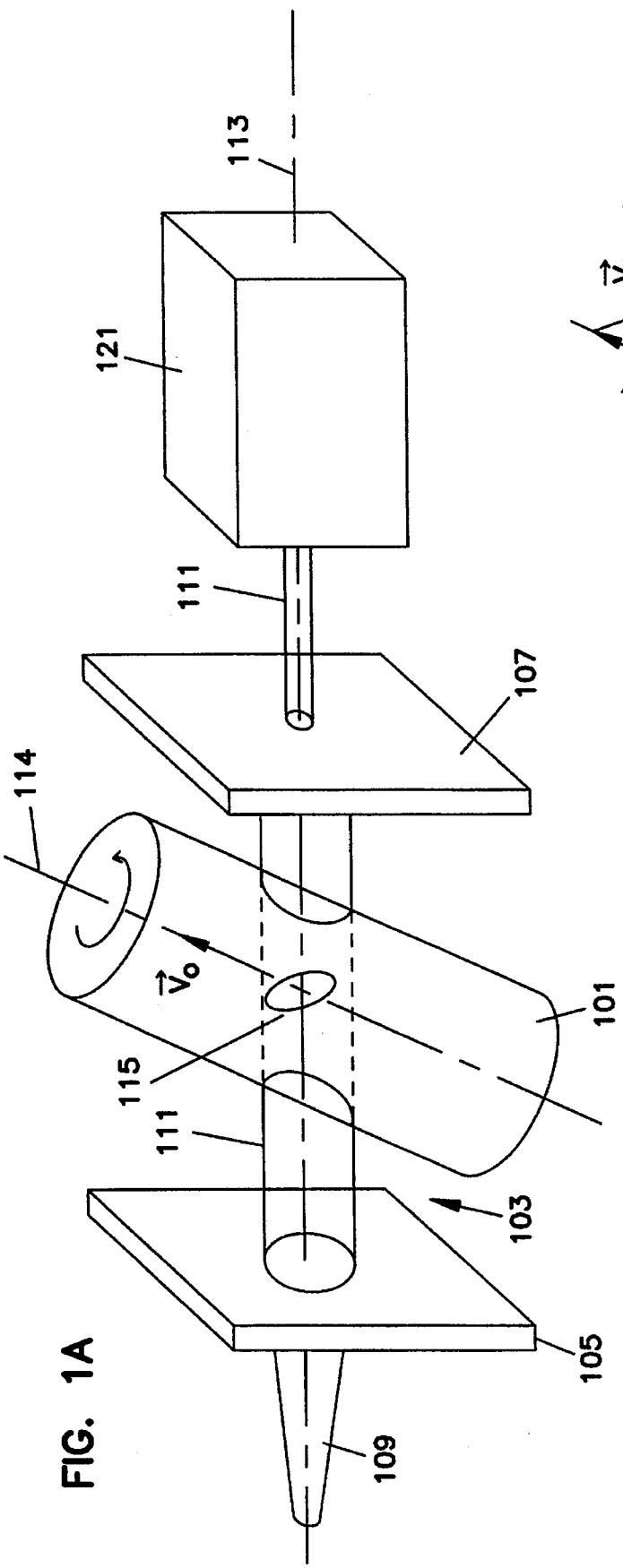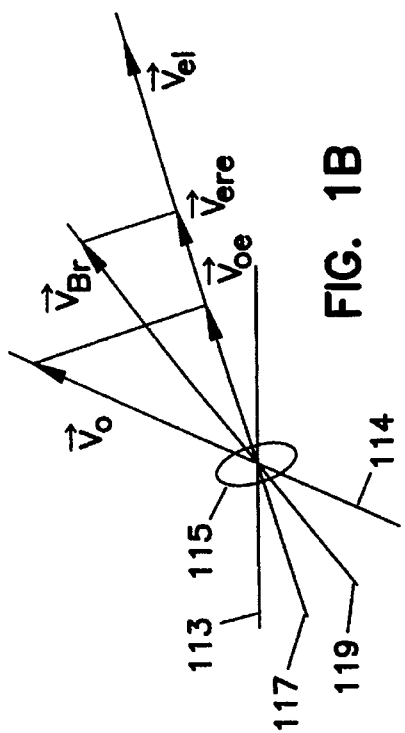
FIG. 1A
FIG. 1B

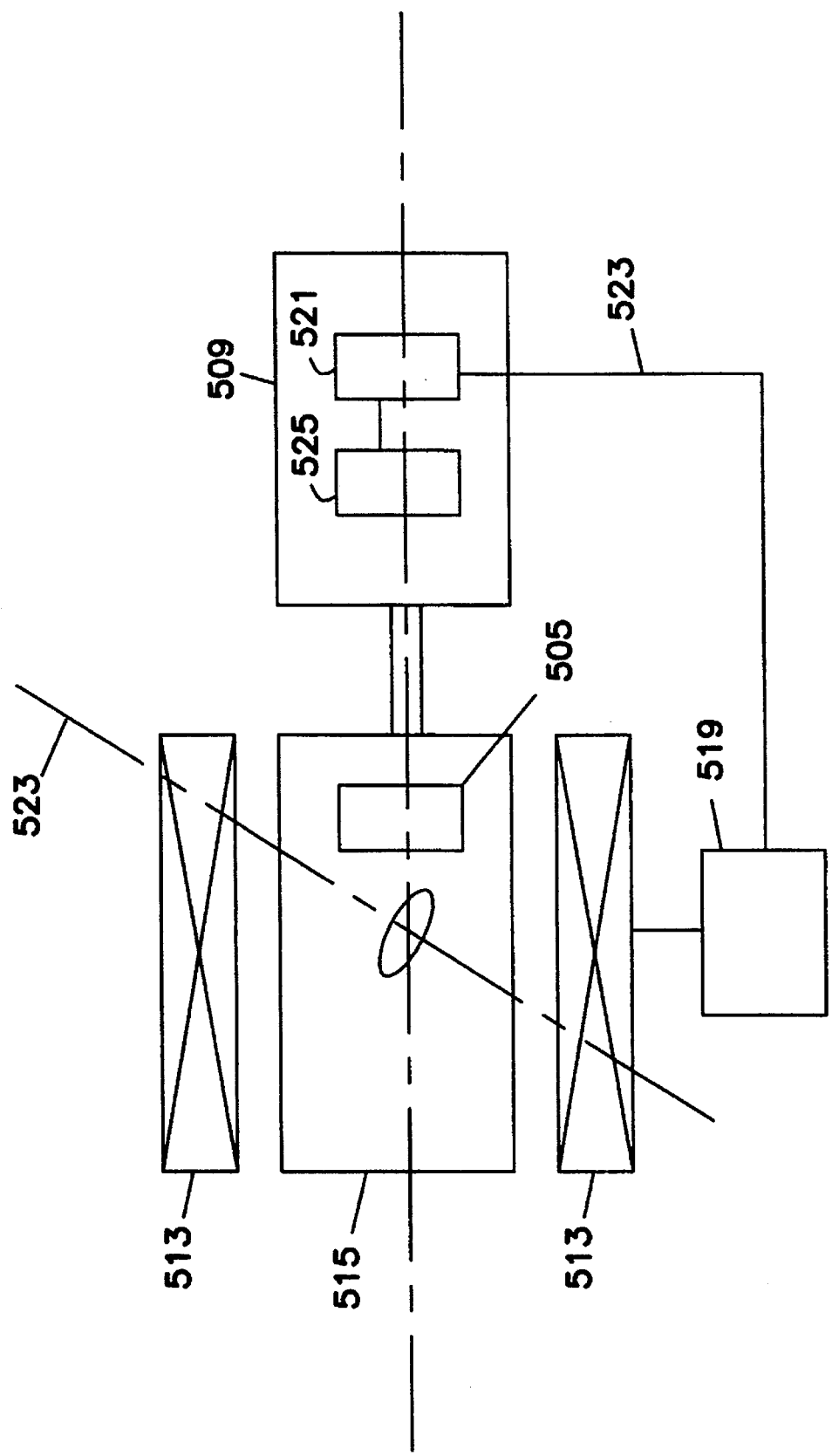

METHOD AND APPARATUS FOR MEASURING ANGULAR VELOCITY OF A TRANSPARENT OBJECT

FIELD OF THE INVENTION

The present invention relates generally to optical rotation sensors, and more particularly to a method and apparatus of using optical or electromagnetic beams propagating parallel to the axis of rotation to measure the rotation of a transparent object such as an optical gyroscope.

BACKGROUND OF THE INVENTION

Optical or other electromagnetic waves which propagate within a closed system may be used to measure the rotation rate of an optical gyroscope without references to outside information. All such gyroscopes are based on the fundamental physics of electromagnetic wave propagation within a rotating system. When a system composed of an optical or electromagnetic source, a propagation path, a medium in which the light waves propagate, and detectors for the light waves are all rigidly mounted with respect to each other but which rotate together as a system, then because of the fundamental physics of such a system, there are measurable effects on the detected waves that permit a user to sense the rate of rotation and the direction of rotation.

There are several manifestations of the fundamental physics of these systems. The best known is the Sagnac effect, which is the basis for several types of existing optical gyroscopes. To induce the Sagnac effect, two optical waves propagate in opposite directions along a closed, generally circular or triangular, coplanar path. It is important that the two counter-propagating waves follow the identical path except in opposite directions. The relative phase between the two waves may be sensed by means of detectors of the interference pattern between the two waves. When there is constant rotation of the system about an axis perpendicular to the plane of the closed optical path, then there is a shift in the relative phase between the two waves, and this shift is proportional to the rate of rotation both in magnitude and sense of direction.

The best known of the practical gyroscopes based on the Sagnac effect is the ring laser gyroscope (RLG). In such a gyroscope, the optical path is filled with a lasing medium providing the light source, and the phase shift of the light manifests itself in a frequency difference between the two counter-propagating waves. For a review of ring laser gyroscopes see, for example, J. E. Killpatrick, "The Laser Gyroscope", IEEE Spectrum, October 1967, vol. 4, pp. 44–55; F. Aronowitz, "The Laser Gyro", in Laser Applications, Vol. 1, M. Ross, Editor, Academic Press, N.Y. 1971, pp. 113–200; and for a more theoretical treatment W. Chow, et al., "The Ring Laser Gyroscope", Reviews of Modern Physics, Vol 57, January 1985, pp. 61–104. A review of the history, of some relevance to the concept described here, is given by C. V. Heer, "History of the Laser Gyro", in the Proceedings of the SPIE, Vol. 487, Physics of Optical Ring Gyros, (Conference, Snowbird, Utah, Jan. 7–10, 1984.), Pub. by SPIE, Bellingham, Wash.; pp. 2–12.

The Sagnac effect has also been exploited in the fiber optic gyroscope (FOG), which differs from the RLG in both the means for providing an optical path and the use of light from sources external to the circular path. In the FOG, the Sagnac phase shift is measured more directly rather than measuring a frequency difference. The FOG is nearing engineering and commercial success. For a review see, for example, R. A. Bergh, et al., "An Overview of Fiber-Optic Gyroscopes", IEEE J. of Lightwave Technology, Vol. LT-2, No. 2, pp. 91–107. An extensive reprint collection of the significant publications and a bibliography has been published. R. B. Smith, Selected Papers on Fiber-Optic Gyroscopes, SPIE Milestone Series Vol. MS 8, published by SPIE Optical Engineering Press, Bellingham, Wash. 1989. A recent topical book is H. Lefevre, Fiber Optic Gyroscopes, Artech House, Mass. 1993.

It is notable that all successful optical gyroscopes to date are based on the Sagnac effect where the light propagates around a closed circular path. Because of this, there is virtually no precedent for rotation sensors based on other possible manifestations of the effects of rotation on electromagnetic wave propagation in rotating systems. Once the Sagnac effect is understood and described, there is no need to return to the fundamental physical laws that give rise to the effect. Consequently in nearly all the publications which describe RLGs and FOGs, there is no description of rotation sensors in which the light propagates in directions other than around closed paths which are generally perpendicular to the axis of rotation.

The concept disclosed here does not depend on the Sagnac effect in that the light or electromagnetic radiation does not propagate along a closed planar path but rather in a direction parallel to the axis of rotation of the gyroscope. Therefore, there appears to be little precedent in the traditional prior art of ring laser or fiber-optic gyroscopes, despite their maturity. Instead, relevant precedent publications appear in earlier descriptions of the physics related to rotation on electromagnetic wave propagation.

The publication by C. V. Heer cited above, "History of the laser gyro", reviews the earliest proposals for RLGs. Two other publications which describe the fundamental physics are: E. J. Post, "Sagnac Effect", Reviews of Modern Physics, Vol. 39, No. 2, April 1967: pp. 475–493., and E. J. Post, "Interferometric Path-Length Changes Due to Motion", J. of the Optical Society of America, Vol. 62, No. 2, February 1972; pp. 234–239. The fundamental treatment in these two articles is general enough to be the basis for describing nearly any effect due to rotation, although the emphasis is on the Sagnac effect. E. J. Post emphasizes that the effects are examples of general relativity, as well as the dependence on the optical properties of the transparent material within which the light propagates.

C. V. Heer, "Resonant Frequencies of an Electromagnetic Cavity in an Accelerated System of Reference", Physical Review, Vol. 134, No. 4A, 18 May 1964, pp. A799–A804, predicted the physical effect on microwaves in a closed cylindrical resonant cavity with the axis of rotation being parallel to the axis of the cylinder. Heer implied that it may be possible to use this physical effect (based on original work by Fermi) to build a sensor to detect angular velocity, but no such device is known to have been proposed in structure or actually built.

This previously described Fermi effect was not experimentally verified until R. V. Jones, "Rotary 'Aether Drag'," Proc. Royal Society, London, Vol. A349, 29 Jun. 1976, pp. 423–439. Jones built a device with a rotating cylinder through which the electromagnetic radiation propagated, but it was not a gyroscope. Further, Jones did not describe the effects and importance of light passing through a medium.

An early patent does describe the use of microwave resonant cavities for rotation sensing, J. B. Speller, "Relativistic Inertial Reference Device", U.S. Pat. No. 3,395,270, issued Jul. 30, 1968, filed Jun. 28, 1962. However, in all of the structures disclosed by Speller, the resonant cavity and the wave path are all toroidal shaped with a circular path, corresponding exactly to the Sagnac effect and not anticipating any devices in which the propagation path is directed parallel to the rotation axis of the device.

Some further background to the present invention is provided by additional work and publications, which discuss the effects of rotation on light propagating along the axis of a cylindrical system wherein the material is rotating with respect to either the light source, the detectors or both. However, none considered any case where the light source, material medium, and the detectors are all fixed with respect to each other, and rotating together as a system. In some cases, reference is made to the Coriolis contribution to the effects of the rotating material. This is a further effect truly due to rotation in inertial space. However, it is an effect acting on the electrons or the material properties of the propagation medium, and not considered acting on the light. It is not proposed by any of the authors for rotation sensing or gyroscopes, including these authors:

R. V. Jones, "Rotary 'Aether Drag'," Proc. Royal Society, London, Vol. A349, 29 Jun. 1976, pp. 423–439.

M. A. Player, "On the Dragging of the Plane of Polarization of Light Propagating in a Rotating Medium" Proc. Royal Society, London, Vol. 349, 1976, pp. 441–445.

N. B. Baranova and B. Ya. Zeldovich, "Coriolis contribution to the Rotary Ether Drag", Proc. Royal Society, London, Vol. A368, 1979, pp. 591–592.

J. P. Woerdman, G. Nienhuis, and I. Kuscer, "Is it possible to Rotate an Atom?", Optics Communications, Vol. 93, No. 1–2, 15 Sep. 1992, pp. 135–144.

G. Nienhuis, J. P. Woerdman, and I. Kuscer, "Magnetic and Mechanical Faraday Effects", Physical Review A, Vol. A46, No. 11, 1 Dec. 1992, pp. 7079–7092.

N. B. Baranova, B. Ya. Zel'dovich and J. P. Woerdman, "Can an Atom be Set in Rotation?", JETP, Vol. 77, No. 3, Sep. 1993, pp. 379–381. (English translation of Zh. Eksp. Teor. Fiz., Vol. 104, September 1993, pp. 2969–2974. Journal title translates as Journal of Experimental and Theoretical Physics, hence J.E.T.P.)

SUMMARY OF THE INVENTION

The present invention provides a method and apparatus for measuring the angular velocity of a rotating substantially transparent object about an object rotation axis. The apparatus excites an electromagnetic field in a resonator such that an electromagnetic beam propagates along the propagation axis parallel to the object rotation axis. The apparatus then detects a field component of the electromagnetic beam. The detected field component of the electromagnetic beam indicates the angular velocity of the object.

BRIEF DESCRIPTION OF THE DRAWINGS

FIG. 1A is a perspective drawing of an angular velocity sensor with an external exciter compatible with the present invention.

FIG. 1B is a vector diagram showing the relationship between various axes (bias rotation axis, object rotation axis, ellipse rotation axis, and propagation axis) relevant to preferred embodiments of the present invention.

FIGS. 5A through 5C are block diagrams showing different embodiments for inducing magnetic field biasing compatible with the present invention.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

It will be recognized that, while the present description makes reference to the use of laser produced light, the new and novel techniques disclosed often are equally applicable to rotating measuring devices which utilize any electromagnetic radiation.

Introduction

In the 1920's, E. Fermi discovered the effect of a polarization plane turn for light waves propagating through a rotating dielectric. It is treated in Fermi's work (dating to 1923) and in the book of "Electrodynamics of continuum" by L. Landau and E. Lifshits (the latest edition).

Figure 9:
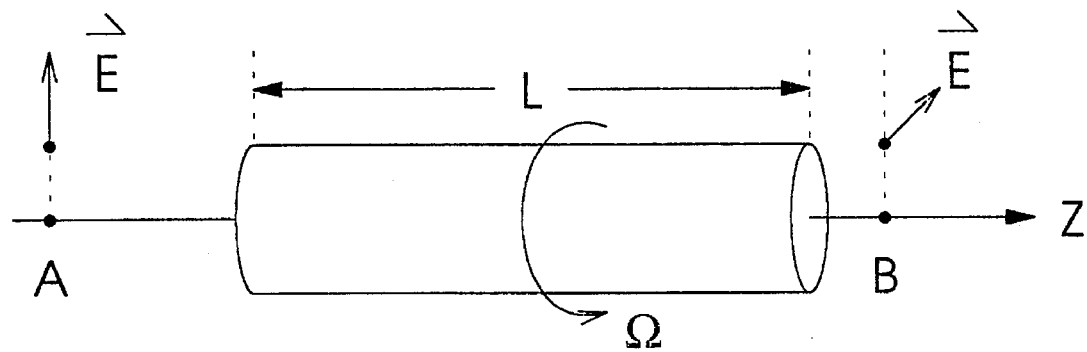
FIG. 9 is a schematic diagram showing a transparent dielectric cylinder compatible with the present invention.

Assume that a linearly polarized light propagates along a rotation axis of a transparent dielectric cylinder as shown in FIG. 9.

By solving the Maxwell equations with no account of dispersion $\epsilon$, Fermi found that the polarization plane in point B turns with respect to the polarization plane in point A by the angle $$\phi = 2\frac{\epsilon - 1}{\omega} \Omega k L \tag{1}$$

where $\omega$ is the light frequency, k the wave number, L the cylinder length, $\Omega$ the frequency of cylinder rotation.

It will be noted that this angle is extremely small and was not observed experimentally until the mid-1970s.

Typically, for $\omega \cong 10^{15}$ Hz, $L \cong 10$ cm, $(\epsilon-1) \cong 10^{-1}$, $k \cong 10^6$ cm$^{-1}$, $\Omega \cong 10^2$ Hz, the angle $\phi$ will be about $10^{-7}$ rad.

In 1976, Jones experimentally verified the Fermi effect. Its theory has been specified twice. In 1976, Player developed it further by taking into account the dispersion $\epsilon$, which changed formula (1) as follows:

$$\phi = \left( 2\frac{\epsilon - 1}{\omega} + \frac{d\epsilon}{d\omega} \right) \Omega k L \tag{2}$$

In 1978, Zel'dovich introduced one more term into this formula, which takes into account the Coriolis forces acting on electrons in the dielectric molecules:

$$\phi = \left( 2\frac{\epsilon-1}{\omega} + \frac{d\epsilon}{d\omega} + q_3 \right) \Omega k L. \quad (2)$$

The term introduced by Zel'dovich is designated by $q_3$. The system of coordinates that rotates together with the cylinder is now considered. It is important to take account of dispersion. In this case the cylinder will be motionless, while a wave incident upon it will have a polarization plane rotating with a frequency $\Omega$. This situation is similar to the case when two waves, with the right and left circular polarizations and frequencies $\omega+106/2$ and $\omega-\Omega/2$, respectively, are incident upon a motionless cylinder. Due to dispersion, the velocities of their propagation through the cylinder will differ by a value proportional to $\Omega d\epsilon/d\omega$. The propagation velocities difference will remain the same for the initial fixed system of coordinates (in calculations for a fixed system of coordinates).

Thus, the right and left circular polarizations of the same frequencies pass through a rotating dielectric with different velocities. This leads to a phase difference between them and, hence, to a turn of polarization plane of a linearly-polarized wave by the angle $$\phi = \frac{d\epsilon}{d\omega} \Omega k L. \quad (4)$$

The Effect of Co-Rotation of Field and Matter

Figure 10:
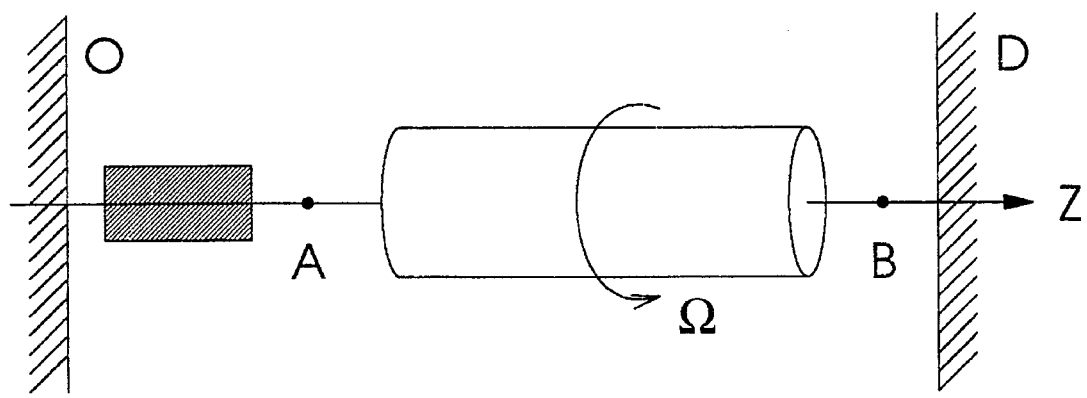
FIG. 10 is a schematic diagram showing a resonator of an electromagnetic field generator compatible with the present invention.

The situation is essentially different if a rotating dielectric is placed inside a resonator of an electromagnetic field generator as shown in FIG. 10.

Since the propagation velocities of left and right polarizations in a rotating cylinder are different, their generation frequencies will differ also. At the generator output there will be a rotating linear polarization with the rotation frequency equal to this frequency difference. The latter is found by the formula $$v = \frac{\int_a^b \frac{d\epsilon}{d\omega} E^2 dz}{\int_o^d \epsilon E^2 dz} \omega \Omega. \quad (5)$$

derived using the well-known perturbation theory for electromagnetic resonators.

Unlike the Fermi effect, here the vector of field E rotates with a frequency $v$ proportional to frequency $\Omega$ of mechanical rotation. This effect is called a "co-rotation of field and matter." In a specific case of rotation of the entire generator, when an active medium fills the whole of the resonator, the wavelength is much shorter than the resonator length, and the field amplitude is homogeneous along the z-axis (laser), formula (5) takes the form $$v = \frac{1}{\epsilon} \frac{d\epsilon}{d\omega} \Omega \omega. \quad (6)$$

It will be noted that in the last case the magnitude of the effect does not depend, in the first approximation, on a generation power and a resonator length.

Comparing this formula (6) with expression (3) for the Fermi effect, it is convenient (for estimation) to write it in the form:

$$v = \frac{\phi}{\tau} \quad (7)$$

where $\phi$ is the rotation angle due to the Fermi effect in one pass in the absence of generation, and $\tau$ is the time of one pass of light waves through a resonator.

The co-rotation effect is most readily seen in the case of very short pulses where a pulse length is much less than the length of a rotating sample.

When a pulse is propagating from point A to point B through a rotating cylinder (FIG. 10), the vector of field E rotates by the angle $\phi$ due to a Fermi effect. Then the pulse reflects from mirror D and goes backward through the rotating cylinder to point A. On reaching this point, the pulse will be turned by the angle $2\phi$ since there is no reciprocity in the Fermi effect. Upon reaching mirror 0, the pulse is reflected and again returns to point A. Afterwards, the pulse once more will pass through the rotating cylinder, and at its output in point B vector E will be turned by the angle $3\phi$, and so on. In this way, the angle of vector E rotation in point B will gradually take the values $\phi$, $3\phi$, $5\phi$, . . .

This change of the polarization vector direction in the given point in time is easily calculated. The average "angular velocity" of vector E rotation is equal to the angle of turn over some long period of time divided by the reflection time.

Assume that over a given time a pulse makes N passes through a resonator. Then, according to the above definition, $$v = \frac{\phi N}{\tau N} = \frac{\phi}{\tau} \quad (8)$$

which coincides with expression (7).

The value of a co-rotation effect can be estimated for a solid-state (for example, Nd) laser by using formula (6):

$$\frac{d\epsilon}{d\omega} \sim \frac{\Delta\epsilon}{\Delta\omega} \sim \frac{\Delta\epsilon}{1/T_2} \sim 10^{-13} \text{ Hz}^{-1}. \quad (9)$$

It follows that $$v \sim 10^{-13} \times 10^{15} \times \Omega \sim 10^2 \times \Omega. \quad (10)$$

By special effort, the co-rotation effect magnitude can be brought up to $$v \sim 10^4 \Omega. \quad (11)$$

An enhanced rotation effect magnitude due to the propagation of an electromagnetic beam through a transparent medium is subsequently referred to in the present application as a Yakubovich effect.

Description

FIGS. 1A and 1B illustrate the general concept of the invention and show an apparatus for measuring angular velocity of a transparent object 101. The preferred apparatus has a resonator 103 fringed with two mirrors 105 and 107, both of which may be semitransparent. The apparatus includes an exciter 109 for exciting an electromagnetic field inside resonator 103 such that an electromagnetic beam 111 propagates along a propagation axis 113. The object 111 is transparent for the electromagnetic field exited in resonator 103 and is placed inside resonator 103 in such a way that it is contained at least partially within the electromagnetic field and rotates about an object rotation axis 114. A polarization ellipse 115 of the E-vector of electromagnetic beam 111 is rotatable about an ellipse rotation axis 117 such that a vector of angular velocity $V_o$ of object 101 has a length component $V_{oe}$ as projected onto ellipse rotation axis 117.

Rotation of the transparent object 101 inside the resonator 103 corresponds to a rotation of the polarization ellipse 115 about the ellipse rotation axis 117 due to the Yakubovich effect, whereby an angular velocity of rotation of the polarization ellipse 115 corresponds to the angular velocity of the object 101. When the object 101 does not rotate about the axis 114, but only turns for a relatively small angle about the axis 114 (a possibility in many cases), the polarization ellipse 115 will also make a turn due to Yakubovich effect, whereby the angular velocity of the polarization ellipse 115 will correspond to the angular velocity of the object 101.

The apparatus also includes detection means 121 placed along the propagation axis 113 and being optically coupled to resonator 103. Detection means described throughout the present application, including detector means 121, may comprise any device responsive to the electromagnetic beam 111 for detecting a field component indicative of the angular velocity $V_o$ of the object 101. Examples include a doped silicon photo diode or a vacuum photo diode.

Accordingly, there are at least two ways for measuring the angular velocity of a transparent object in accordance with the invention. One is to measure a frequency corresponding to a frequency of rotation of the polarization ellipse of the E-vector when detecting a field component of the electromagnetic beam, and the other is to measure an angle turn of the polarization ellipse of the E-vector when doing the same. These are subsequently referred to in the present application as a Yakubovich frequency and a Yakubovich angle.

FIG. 1 illustrates a case when the electromagnetic field is excited in the resonator 103 when utilizing an external exciter 109. It will be understood that the electromagnetic field in the resonator 103 can be excited in any way, including all ways presently known in the prior art. The only limitation is that there should be provided the above-mentioned conditions for the Yakubovich effect to take place.

Figure 2:
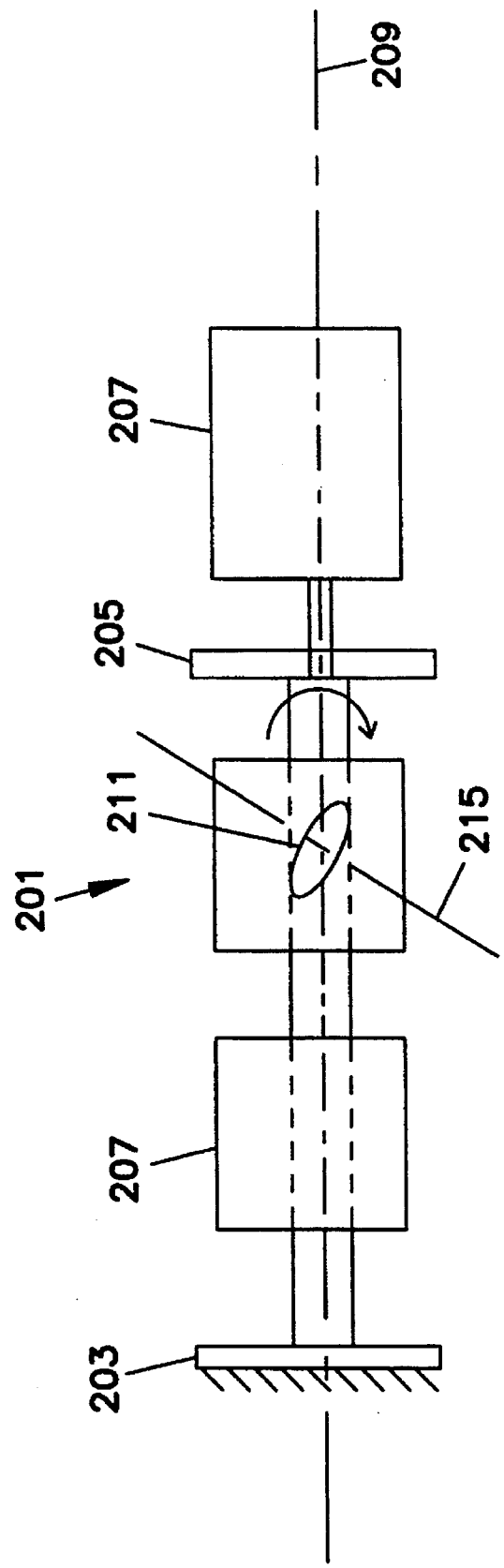
FIG. 2 is a block diagram of an angular velocity sensor with an internal active medium.

FIG. 2 illustrates another way of exciting an electromagnetic field in a resonator 201. The angular velocity sensor shown on FIG. 2 has a resonator 201 comprising two mirrors 203 and 205, whereby mirror 205 is semitransparent (Fabri-Perot, for example). Placed in resonator 201 is an active gain medium 208 for exiting an electromagnetic field in the resonator 201. In this embodiment, object 201, being placed in resonator 201, rotates about a rotation axis 209 that is aligned with propagation axis 213. Detection means 207 is placed along propagation axis 209 and is optically coupled to resonator 201. The polarization ellipse 211 rotates about the ellipse rotation axis 215.

It will be recognized that many types of active gain medium may be used without loss of generality, for example, a yttrium doped glass rod, Nd solid state laser, or other laser may be used.

Figure 3B:
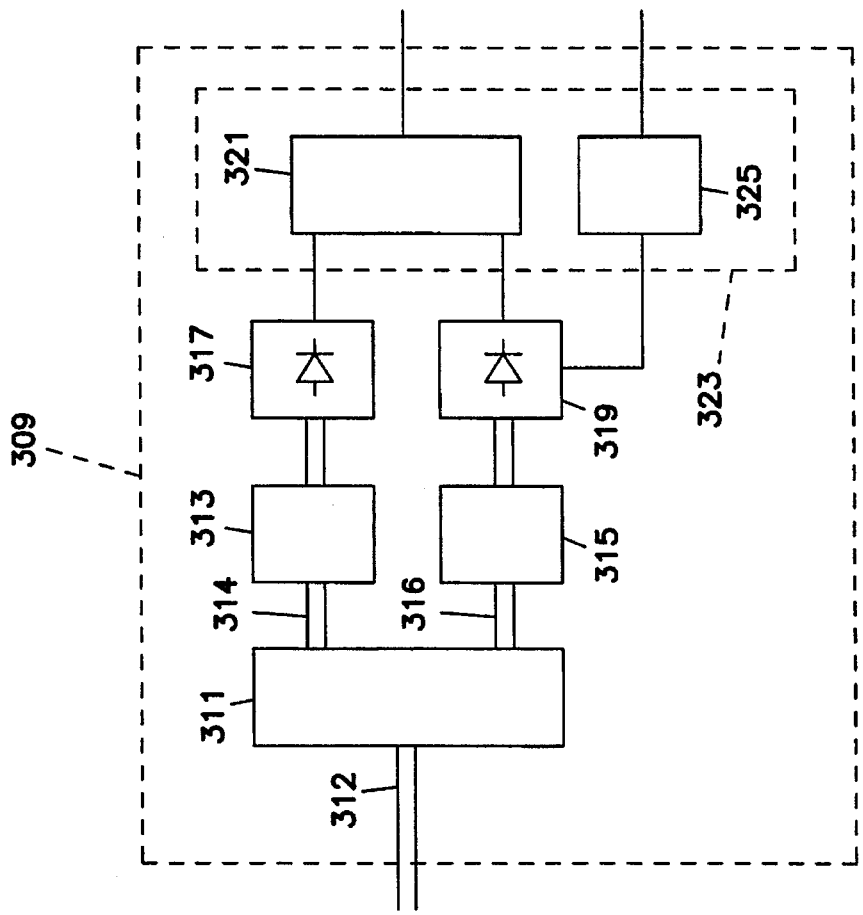
FIGS. 3A through 3C are block diagrams showing different embodiments of detection means compatible with the present invention.
Figure 3A:
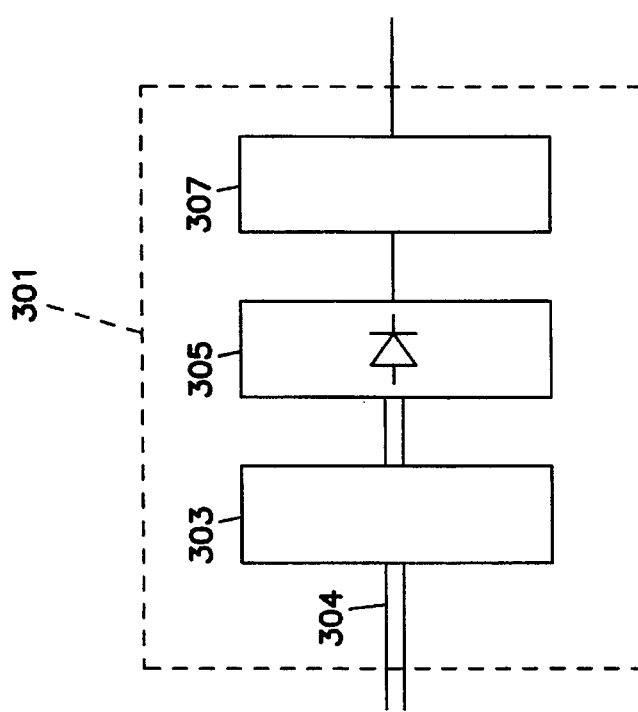
Figure 3C:
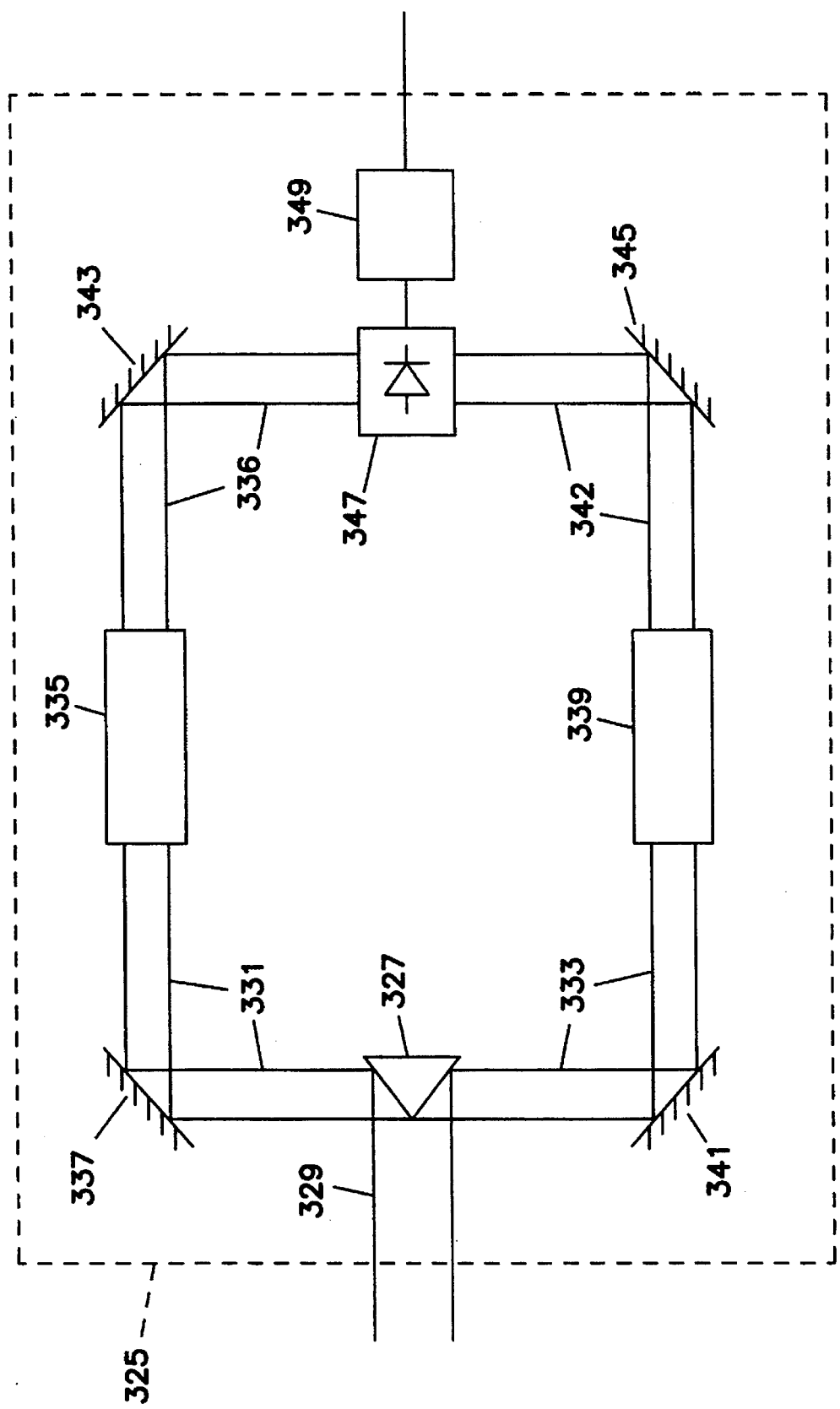

FIGS. 3A, 3B, and 3C show three different embodiments of detection means that can be used for indicating or measuring both the Yakubovich frequency and the Yakubovich angle turn of the polarization ellipse of the E-vector.

Detection means 301 and 309 shown in FIGS. 3a and 3b are based on detecting the intensity modulation of at least one directional component of the E-vector.

Detection means 301 shown in FIG. 3A has a polarization filter 303 positioned on the propagation path of the beam and is optically coupled to a detector 305. In the case where the object 101 rotates about the object rotation axis 209 and causes a rotation of the polarization ellipse 115, the polarization filter 303 screens the directional component of the beam 304, whereby the intensity of the screened directional component is modulated with a frequency corresponding to a Yakubovich frequency.

Detector 305 detects an intensity modulation of the directional component 304 and produces a signal having a frequency corresponding to Yakubovich frequency. The detector 305 is electrically coupled to an indicator 307. Indicator 307 in this case can be a frequency analyzer for producing a signal corresponding to the value of the angular velocity of the object 101.

Detection means 309 shown by FIG. 3b has a beam splitter 311 for splitting the electromagnetic beam 311 into first 314 and second 316 beams and being positioned on the propagation path of beam 312. The beam splitter 311 is optically coupled to a polarization filter 313 for screening a first polarization plane of the E-vector of beam 314 and optically coupled to a polarization filter 315 for screening a second polarization plane of beam 316, the second polarization plane being substantially different in orientation from the first polarization plane. The polarization filter 313 is optically coupled to a detector 317 and the polarization filter 315 is optically coupled to a detector 319.

The same as in the embodiment shown in FIG. 3A in the case when the object rotates about the object rotation axis 209 and calls to a rotation of the polarization ellipse 211, detectors 317 and 319 detect the intensity modulation of beams 314 and 316 respectively. Detectors 317 and 319 produce each from beams 314 and 316 respectively a first and second signal having a frequency corresponding to Yakubovich frequency. Detectors 317 and 319 are electrically coupled to an indicator 325 for comparing an intensity derivative of the first signal to an intensity derivative of the second signal to produce a signal corresponding to the sign of an intensity derivative of the first signal as it is related to the intensity derivative of the second signal. Those skilled in the art will recognize that a logic circuit may be used to accomplish this procedure. The sign corresponds to the direction of the angular velocity of the object 201. Indicator 325 can also include a frequency analyzer 323, that can be electrically coupled either to detector 317 or to detector 319 for producing a signal corresponding to the value of the angular velocity of the object 201.

Detection means 326 shown on FIG. 3C comprises a beam splitter 327 for splitting the electromagnetic beam 329 into first 331 and second 333 beams and being positioned on the propagation path of the beam 329. The beam splitter 327 is optically coupled to an absorber 335 through a mirror 337 for detecting a left hand circularly polarized component 336 of the electromagnetic beam 329, and optically coupled to an absorber 339 through a mirror 341 for detecting a right hand 342 circularly polarized component of the electromagnetic beam 329. Absorber 335 through a mirror 343 and absorber 339 through a mirror 345 are optically coupled to a converter 347 for comparing the left hand circularly polarizer component 336 to the right hand circularly polarized component 342 and producing a signal A corresponding to a frequency difference between left hand 336 and right hand 342 circularly polarized components.

It is to be understood that the frequency difference corresponds to a Yakubovich frequency. Accordingly, an indicator 349, typically a frequency analyzer, being electrically coupled to the converter 347, produces a signal corresponding to the value of the angular velocity of the object 101. Those skilled in art will recognize the use of a modification of the mixer 347 to produce, in addition to signal A, a signal B corresponding to a sign of frequency difference between components 336 and 342. In this case, indicator 349 (e.g., a frequency analyzer) can produce, in addition to signal L or instead of it, a signal M corresponding to the direction of the angular velocity of the object 201.

A phenomenon similar to one inherent in an angular velocity sensor based on the Sagnac effect and known as a lock-in may occur as well in the angular velocity sensor based on the Yakubovich effect. In an angular velocity sensor based on the Yakubovich effect, the lock-in phenomena occurs in the fact that, when the value of the angular velocity of the object is small (less than approximately 2 pi rad/sec), the polarization ellipse does not rotate in accordance to the rotation of the object.

To avoid the effect of lock-in, the apparatus for measuring angular velocity can be biased by inducing a bias rotation of the polarization ellipse 115 of the E-vector about the ellipse rotation axis 117 (FIG. 1).

The bias rotation of the polarization ellipse 115 can be performed by mechanically rotating the object 101 about a bias rotation axis 119 such that a vector $V_{br}$ of angular velocity of the mechanical rotation has a length component $V_{bre}$ as projected onto the ellipse rotation axis 117. Devices for producing a bias mechanical rotation are well-known by those skilled in the art.

Figure 4:
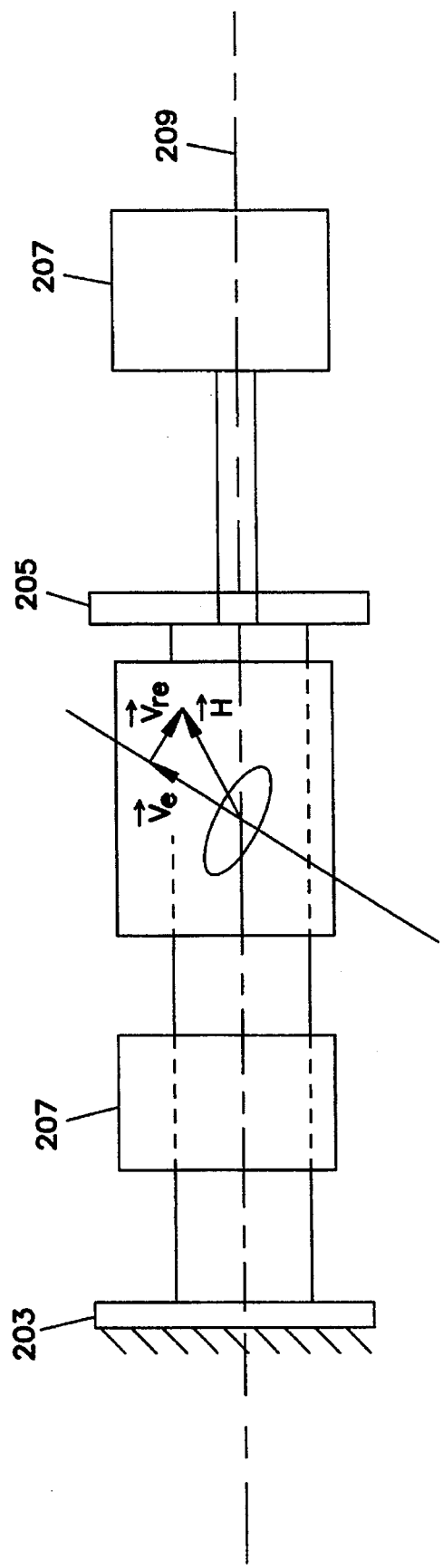
FIG. 4 is a block diagram showing an embodiment of an angular velocity sensor with an internal active medium and magnetic field biasing compatible with the present invention.

The bias rotation of the polarization ellipse can be performed also by providing a magnetic field in resonator 201 (see FIG. 4). FIG. 4 shows an angular velocity sensor of FIG. 2 with a magnetic field provided in the resonator 201. As shown in FIG. 4, the magnetic intensity vector H of the magnetic field has a length component as projected onto the ellipse rotation axis 215. Object 101 is to be contained at least partially within the magnetic field.

In practice, assuming the use of a typical Nd-laser, a longitudinal magnetic field of about 1.0 Gauss causes an output field rotation of substantially between 10–100 Hz, which is equivalent to a mechanical bias rotation of substantially between 1–10 Hz. The locking band of typical Sagnac devices is usually of the order of about 100 Hz. The locking band of the preferred embodiment of the present invention typically also does not exceed about 100 Hz, and therefore a bias magnetic field of 10 Gauss will typically be sufficient to overcome the effect of lock-in.

In this case, the angular velocity of the polarization ellipse of the E-vector will have an additional component due to the Faraday effect. The value of that additional component is determined by the intensity of the magnetic field provided in the resonator 201. Depending on the direction of the magnetic field that is induced into the resonator 201, the polarization ellipse will rotate either in the same direction as it did due to the Yakubovich effect or in the opposite direction.

Figure 5A:
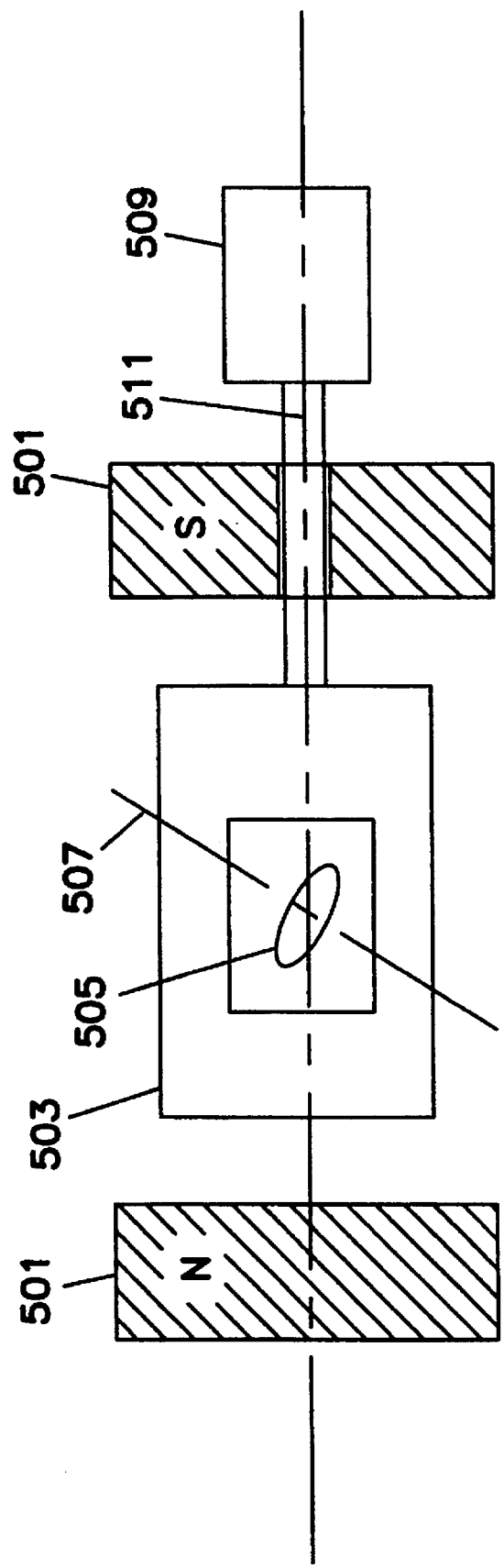

The magnetic field provided in the resonator 201 can be either static or alternating. A static magnetic field can be provided by a permanent magnet 501 (FIG. 5A) placed proximate the resonator 503, so that north and south poles of the magnet 501 are positioned to provide penetration of lines of force into the object 505 in such a way that the intensity vector H of the magnetic field has a length component He as projected onto the ellipse rotation axis 507. The resonator 503 is optically coupled to the detection means 509 through a hole 511 in the magnet 501. Detection means 509 can be as shown in FIG. 3A.

The signal produced by the detector 305 (see FIG. 3A) has a frequency that equals to a sum of a frequency corresponding to Yakubovich frequency and a frequency corresponding to a Faraday frequency, the frequency of rotation of the polarization ellipse due to Faraday effect. Accordingly, in order to have the indicator 307 produce a signal corresponding to the value of the angular velocity of the object 505, the indicator 307 can be calibrated beforehand so as to take account of the Faraday effect. When the Faraday frequency is determined by calibration, and when the direction of the magnetic field is known by, then by comparing the Faraday frequency to the sum frequency the direction of the angular velocity of the object can be determined also.

Figure 5B:
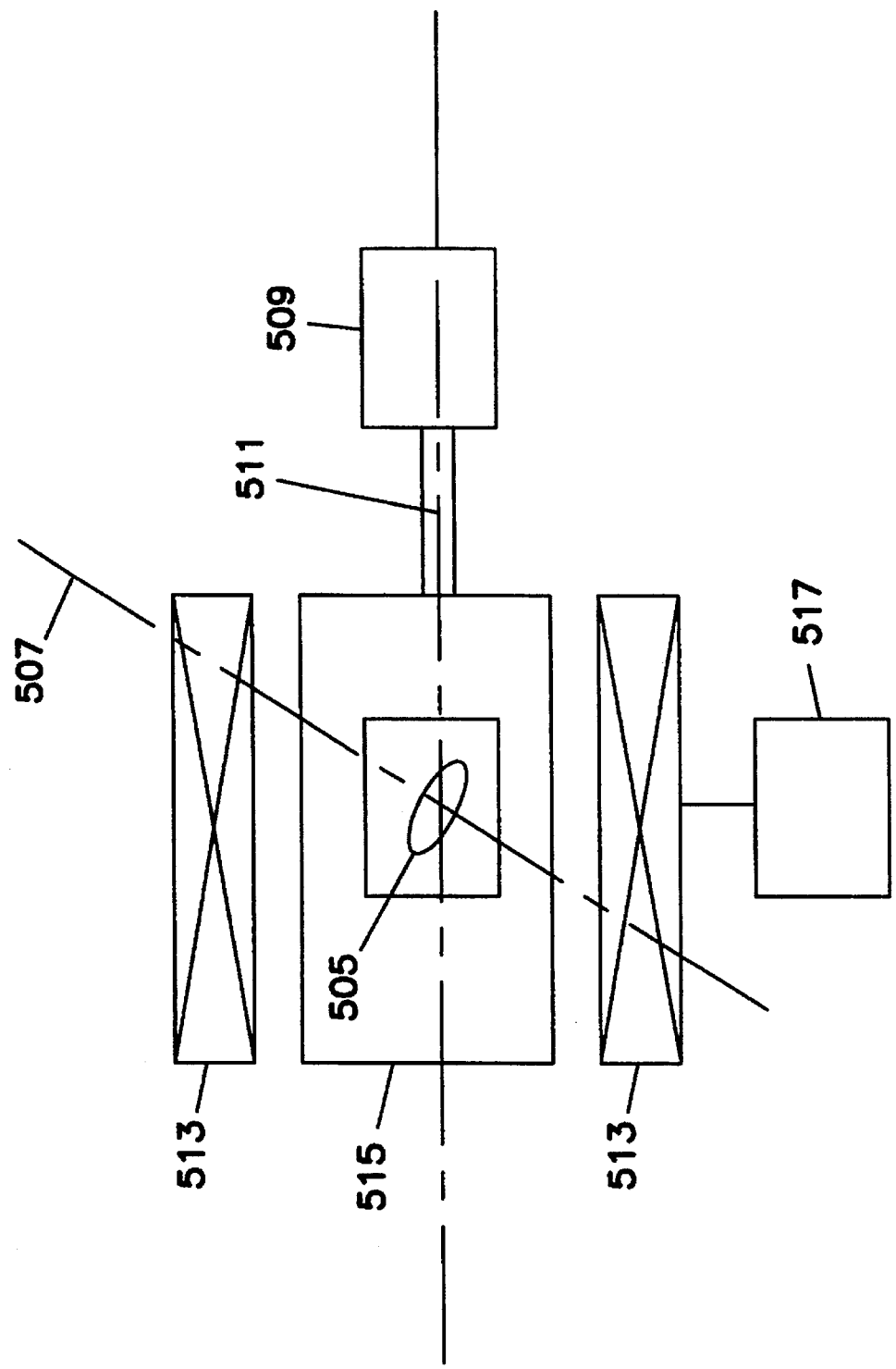

A static magnetic field can be provided by a solenoid 513 (see FIG. 5B) placed proximate the resonator 515, with the solenoid being electrically coupled to a DC power source 517. The magnetic field is induced in the same manner as in the embodiment shown on FIG. 5A. The same detection means 509 can be used to measure the angular velocity of the object 505.

FIG. 5C shows an embodiment similar to one shown of 5B in which the power source 519 is an alternating current power source. In this case, since there is an AC source connected to the solenoid 513, the alternating magnetic field in the resonator 515 will result in dithering the polarization ellipse 505 about the ellipse rotation axis 507 due to the Faraday effect. In this case, the signal produced by the detector 525 has a spectrum of frequencies corresponding to the Faraday effect. As soon as the object 505 rotates, there will be provided a frequency shift in the spectrum due to Yakubovich effect.

There are at least two ways of measuring the angular velocity of the object 505 when involving an AC magnetic field in the resonator. One is to use a spectrum analyzer as an indicator 521 and, after it is calibrated in the same manner as when a DC source is used, the frequency shift can be measured, whereby the frequency shift corresponds to the value of the angular velocity of the object 505. When the dithering spectrum that occurs due to Faraday effect is determined by calibration, the sign of the frequency shift can be determined as well, and it will correspond to the direction of the angular velocity of the object.

Another way to measure the angular velocity of the object 505, in the case of an AC magnetic field in the resonator 515, is to use a frequency analyzer as the indicator 521, but have it synchronized with the AC source 519. In this case, a frequency corresponding to Faraday effect when calibrating the indicator 521, as well as the sum frequency, is measured during predetermined short time intervals. After that, the value and direction of the angular velocity of the object 505 is derived in the same manner as in the previous case.

Figure 6A:
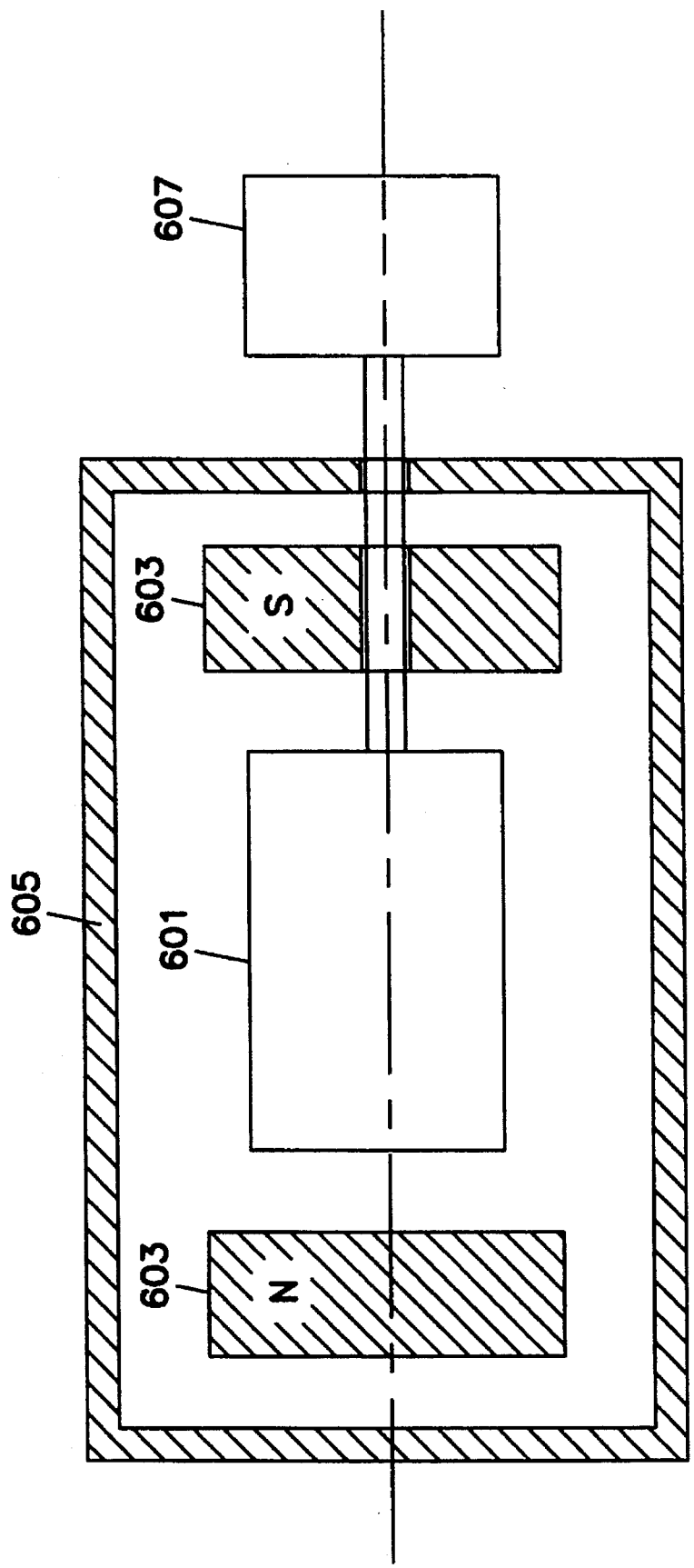
FIGS. 6A and 6B are block diagrams showing different embodiments of magnetic shielding compatible with the present invention.

In accordance with a preferred embodiment of the present invention, the resonator can be surrounded by a magnetic shield made of permalloy, for example, for shielding the resonator from external magnetic fields. FIG. 6A shows an embodiment in which the resonator 601 together with the magnet 603 are surrounded by a housing 605 made of a magnetic material that acts like a shield from external magnetic fields. Detection means 607, through a hole in magnet 603 and a hole in shield 605, are optically coupled to the resonator 601 and, in this special case, are positioned outside of the shield. However, it should be understood that the detection means 607 (which can be as shown on FIG. 3A or 3C) can be positioned wholly inside of the shield, or some of the elements of detection means 607 can be positioned inside the shield, and others outside of it.

Figure 6B:
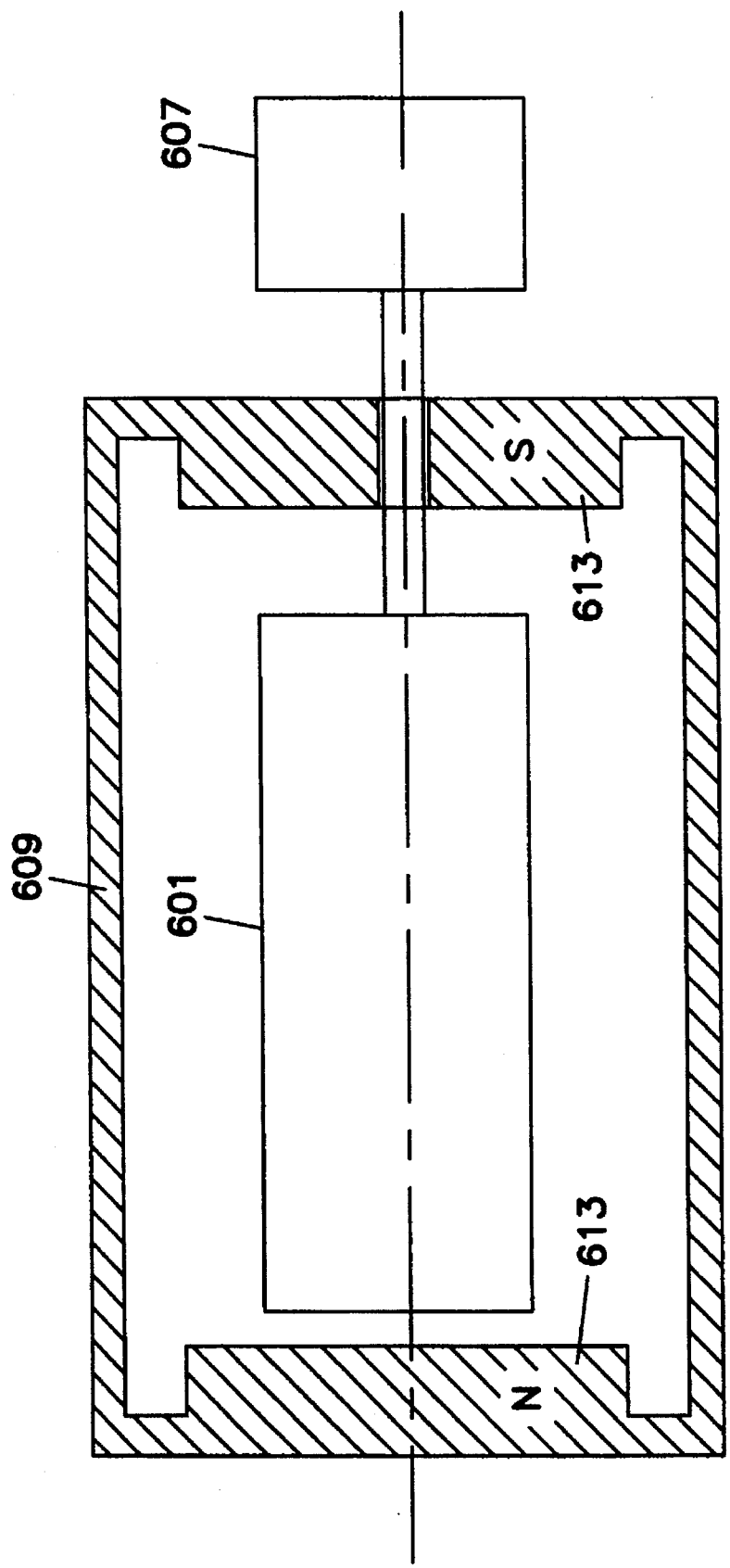

FIG. 6 shows another embodiment in which the resonator 601 is surrounded by a housing 609 made of a magnetic material that acts as a shield from external magnetic fields. A part of the housing 609 that is perpendicular to the propagation axis 611 is strengthened so that it acts additionally as a permanent magnet 613 for inducing a static magnetic field. Detection means 607 in accordance with the embodiment shown on FIG. 6A may be the same for the embodiment on FIG. 6B.

In practice, assuming a screen comprising a metallic cylinder with high magnetic permittivity M, the ratio of the magnetic field outside it to the field inside it equals M multiplied by thickness of the screen, divided by diameter of the cylinder. For example, assuming M is of the order of 1000, the screen thickness is 1 mm, and the cylinder diameter is 5 mm, the attenuation of magnetic field inside the cylinder will be approximately 200 times. This calculation is valid for frequencies between 0–10 KHz. To obtain better attenuation, it will be recognized that multilayer coaxial screens with magnetically isolated layers may be used. The total attenuation coefficient of such system will typically be the product of the partial coefficients of the screens.

The previously described embodiments comprise an active gain medium and an object, both contained in the resonator so that the resonator and active gain medium are stationary, while the object rotates. It has been shown above that, in this case, a Yakubovich effect takes place. Similarly, if the resonator with the active gain medium rotates together with the object, the Yakubovich effect will exist as well. In such a case, there is no necessity of having a separate gain medium and separate object, though it is possible in accordance with preferred embodiments of the invention. Accordingly, in this case the active gain medium can act as the object and that is the case illustrated by FIG. 7.

Figure 7:
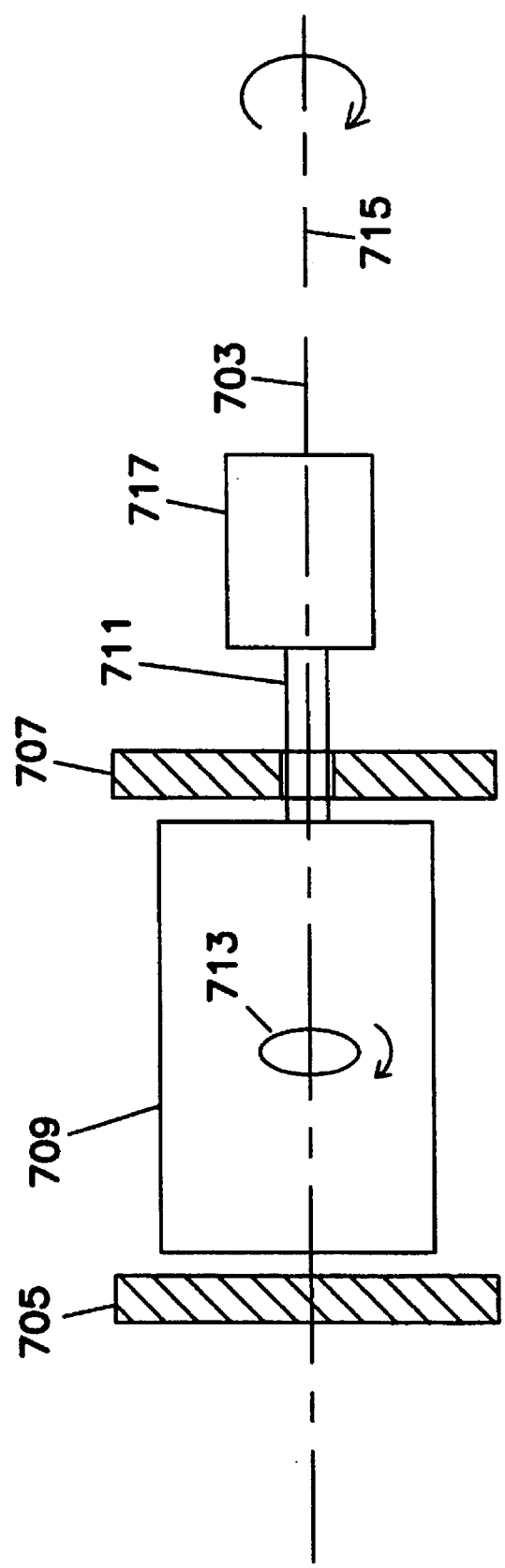
FIG. 7 is a block diagram showing a gyroscope compatible with the present invention.

FIG. 7 shows an embodiment of a sensor comprising a resonator 701 having a propagation axis 703. The resonator 701 is fringed by mirrors 705 and 707, with mirror 707 being semitransparent. An active gain medium is contained within the resonator 701 for generating an electromagnetic beam 711 that propagates through the medium along the propagation axis 703. The resonator 701 and medium 709 are configured so that they allow for a rotation of the polarization ellipse of the E-vector about the propagation axis. This requires that the ellipse rotation axis 715 be aligned with the propagation axis 703. Detection means 717 is positioned on the propagation axis 703 optically coupled to the resonator 701. Detection means 717, which may typically comprise a silicon photo diode or a vacuum photo diode, is responsive to the electromagnetic beam 711 for detecting a field component of the electromagnetic beam, the field component being indicative of the angular velocity of the sensor.

When measuring the angular velocity of the object corresponding to the Yakubovich angle turn, it is preferable to invoke a bias rotation of the polarization ellipse of the E-vector. In this case, the angular velocity of the object can be measured by using detection means shown in FIG. 3A or 3B.

When the detection means of FIG. 3A is used, the polarization filter 303 screens the directional component of the beam 304 so that the intensity of the screened directional component is modulated with a frequency corresponding to a bias frequency. The phase of the modulation of the screened directional component has a time dependance corresponding to a change of the Yakubovich angle turn. This bias frequency is the frequency of the bias rotation of the polarization ellipse of the E-vector. The detector 305 then produces a signal having a frequency corresponding to the bias frequency, whereby the phase of the signal has a time dependence corresponding to a change of the Yakubovich angle turn.

Figure 8B:
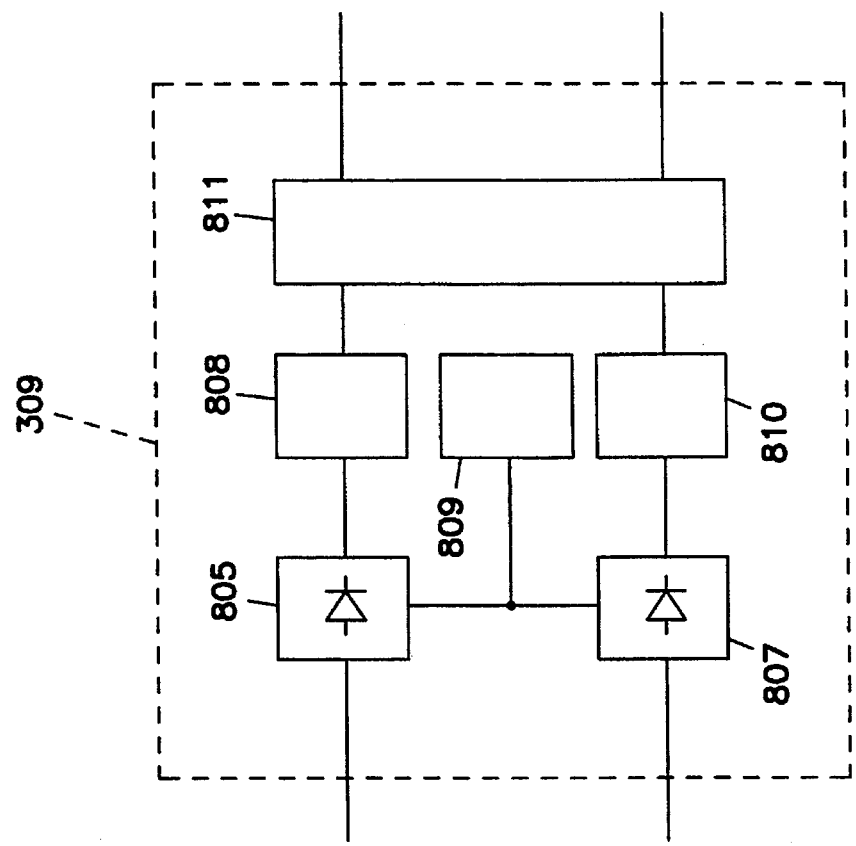
FIGS. 8A and 8B are block diagrams showing different embodiments of an output indicator compatible with the present invention.
Figure 8A:
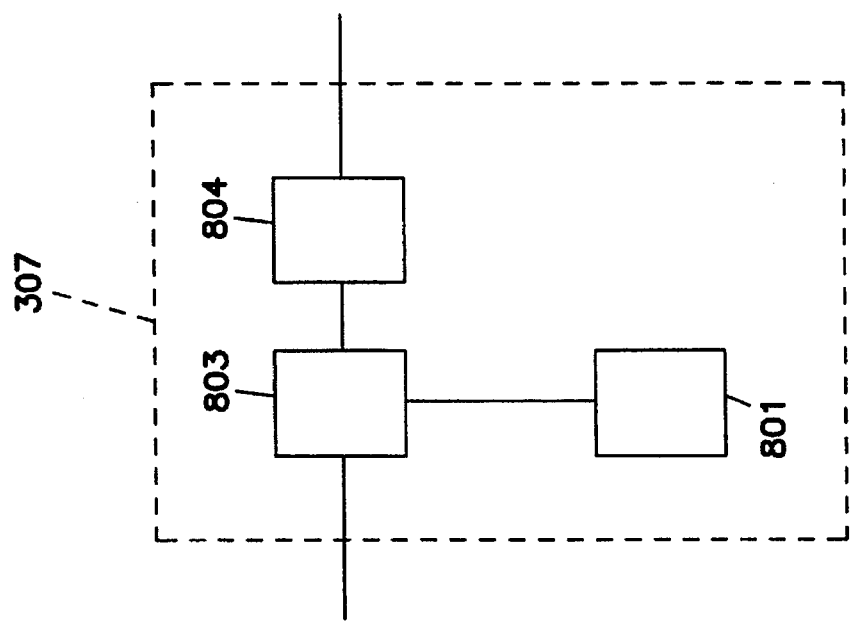

For measuring the change of the Yakubovich angle turn, the indicator 307 is to be modified as shown by FIG. 8A. Indicator 307 shown by FIG. 8A comprises a generator 801 for producing a signal corresponding to the bias frequency, that can be measured by calibration, and a phase meter 803 for comparing the signal coming from the detector 305 and the generator 801. The phase meter 803 produces a signal corresponding to the phase time dependence of the signal coming from the detector 305 that corresponds to the change of the Yakubovich angle turn. The phase meter 803 is electrically coupled to a derivator 804, for producing a signal corresponding to a derivative of the signal coming from the phase meter 803, whereby the derivative corresponds to the value of the angular velocity of the object.

The direction of the angular velocity of the object can be measured using detection means according to FIG. 3B where the indicator 309 is modified as shown on FIG. 8B. In this case the polarization filter 313 screens a first directional component in a first plane and the polarization filter 315 screens a second directional component in a second plane, the second plane being substantially different in orientation from the first plane. The intensities of the screened directional components are modulated with a frequency corresponding to the bias frequency. The phase of the modulation of each of the screened components has a time dependence corresponding to a change of the Yakubovich angle turn.

Accordingly, detectors 317 and 319 each produce from beams 314 and 316 a first and second signal having a frequency corresponding to the bias frequency, whereby the phase of each signal has a time dependence corresponding to a Yakubovich angle turn.

For measuring the direction of the Yakubovich angle turn, the indicator 325 can be modified as shown in FIG. 8B. Indicator 325 shown by FIG. 8B comprises a generator 805, for producing a signal corresponding to the bias frequency, that can be measured by calibration. The generator 805 is electrically coupled to a phase meters 807 and 809.

Phase meter 807 compares the signals coming from the generator 805 and the detector 317 and produces a first signal corresponding to the phase time dependance of the signal coming from the detector 317, that corresponds to a change in the Yakubovich angle turn. Phase meter 809 compares the signal coming from the detector 319 and the generator 805 and produces a second signal corresponding to the phase time dependance of the signal coming from the detector 319. Phase meter 807 is electrically coupled to a derivator 808 for producing a signal corresponding to an intensity derivative of the signal coming from the phase meter 807. Phase meter 809 is electrically coupled to a derivator 810, for producing a signal corresponding to an intensity derivative of the signal coming from the phase meter 809. A phase difference meter 811, electrically coupled to the derivators 808 and 810, and compares the intensity derivative of the first signal to the intensity derivative of the second signal to produce a signal corresponding to the sign of an intensity derivative of the first signal as it is related to the intensity derivative of the second signal. The sign corresponds to the direction of the angular velocity of the object. Indicator 325 can also include an output from either the derivator 808 or derivator 810 for outputting the signal corresponding to the value of the angular velocity of the object.

For the case when the bias rotation of the polarization ellipse of the E-vector is produced by mechanically rotating the object, the bias frequency corresponds to the Yakubovich frequency. In the case when the bias rotation of the polarization ellipse is produced by inducing a magnetic field in the resonator, the bias frequency corresponds to the Faraday frequency.

For measuring the angular velocity of the object due to Yakubovich angle turn detection means shown in FIG. 3A, 3B or 3C can be used.

When the detection means of FIG. 3A is used the polarization filter 303 screens the directional component of the E-vector of the beam 304 whereby the intensity of the screened directional component is modulated with a phase that has a time dependence corresponding to a change of the Yakubovich angle turn. The detector 305 then produces a signal corresponding to the time dependence of the phase. The indicator 307 is to be modified for producing a signal corresponding to a derivative of the signal coming from the detector 305, whereby the derivative corresponds to the value of the angular velocity of the object.

The direction of the angular velocity of the object can be measured using detection means according to FIG. 3B. In this case the polarization filter 313 screens a first directional component of the E-vector in a first plane and the polarization filter 315 screens a second directional component of the E-vector in a second plane. The intensities of the screened directional components are modulated with a phase that has a time dependence corresponding to the change of Yakubovich angle turn.

So the detectors 317 and 319 each produce from beams 314 and 316 a first and second signal corresponding to the time dependence of the phase.

The indicator 315 may be modified to produce signals corresponding to derivative of the signals coming from detectors 317 and 319 and to produce a signal corresponding to the relationship of the two derivatives, whereby the sign of the relationship corresponds to the orientation of the angular velocity of the object.

If detection means shown in FIG. 3C is used the converter 397 is to be modified for producing signals corresponding to the time dependencies of the phases of the left and right hand circularly polarized components and for comparing the two time dependencies for producing a signal corresponding to the relationship of the derivatives of the two time dependencies, whereby the value of the relationship corresponds to the value of the angular velocity of the object while the sign of the relationship corresponds to the orientation of the angular velocity of the object.

The present invention is to be limited only in accordance with the scope of the appended claims, since others skilled in the art may devise other embodiments still within the limits of the claims.

What is claimed is:

1. A method for measuring the angular velocity of a rotating substantially transparent object about an object rotation axis comprising the steps of:
   (a) placing the object in a resonator of an electromagnetic field generator having a propagation axis;
   (b) exciting an electromagnetic field in the resonator such that an electromagnetic beam propagates along the propagation axis wherein the electromagnetic beam is substantially parallel to the object rotation axis; and
   (c) detecting a field component of the electromagnetic beam, the field component being indicative of the angular velocity of the object about the object rotation axis.

2. The method of claim 1 wherein the electromagnetic beam propagates along the propagation axis under conditions resulting in a polarization ellipse of an E-vector of the electromagnetic beam, wherein the polarization ellipse of the E-vector is rotatable about an ellipse rotation axis such that a vector of angular velocity of the object has a substantial length component as projected onto the ellipse rotation axis, the object being contained at least partially within the electromagnetic field.

3. The method of claim 2 wherein the step of detecting a field component comprises the step of measuring a frequency corresponding to a Yakubovich frequency of rotation of the polarization ellipse of the E-vector, whereby the frequency corresponds to a value of the angular velocity of the object.

4. The method of claim 3 wherein the step of detecting a field component comprises measuring a frequency of an intensity modulation of at least one directional component of the E-vector.

5. The method of claim 2 wherein the step of detecting a field component further comprises the steps of:
   (a) detecting a first directional component of the E-vector of the electromagnetic field corresponding to the Yakubovich frequency in a first plane;
   (b) detecting a second directional component of the E-vector of the electromagnetic field corresponding to the Yakubovich frequency in a second plane having a different angle of polarization from the first plane; and
   (c) comparing the first directional component to the second directional component to determine a difference between the phases, whereby the sign of the difference between the phases corresponds to the direction of angular velocity of the object.

6. The method of claim 3 wherein the step of measuring a frequency comprises measuring a frequency difference between left hand and right hand circularly polarized components of the E-vector, whereby the sign of the frequency difference corresponds to the direction of angular velocity of the object.

7. The method of claim 2 further comprising the step of inducing a bias rotation of the polarization ellipse of the E-vector about the ellipse rotation axis.

8. The method of claim 7 wherein the step of inducing the bias rotation of the polarization ellipse is performed by mechanically rotating the object about a bias rotation axis, such that a vector of angular velocity of the mechanical rotation has a length component as projected onto the ellipse rotation axis.

9. The method of claim 7 wherein the step of inducing the bias rotation of the polarization ellipse is performed by providing a magnetic field in the resonator, the object being contained at least partially within the magnetic field, such that an intensity vector of the magnetic field has a length component as projected onto the ellipse rotation axis.

10. The method of claim 7 wherein the step of detecting a field component comprises the step of measuring a frequency corresponding to a Yakubovich frequency of rotation of the polarization ellipse of the E-vector, whereby the frequency corresponds to a value of the angular velocity of the object.

11. The method of claim 10 further comprising the step of comparing the Yakubovich frequency to a bias frequency of the bias rotation of the polarization ellipse, whereby the sign of the frequency difference corresponds to the direction of angular velocity of the object.

12. The method of claim 10 wherein the step of detecting a field component comprises measuring a frequency of an intensity modulation of at least one directional component of the E-vector.

13. The method of claim 10 wherein the step of measuring a frequency comprises measuring a frequency difference between left hand and right hand circularly polarized components of the E-vector, whereby the sign of the frequency difference corresponds to the direction of angular velocity of the object.

14. The method of claim 2 wherein the step of detecting a field component comprises the step of measuring a phase corresponding to a Yakubovich angle turn of the polarization ellipse of the E-vector, whereby the angle corresponds to the value of the angular velocity of the object.

15. The method of claim 14 wherein the step of measuring a phase further comprises measuring a phase of an intensity modulation of a directional component of the E-vector.

16. The method of claim 2 wherein the step of detecting a field component further comprises the steps of:
   (a) detecting a first directional component of the E-vector of the electromagnetic field corresponding to a Yakubovich angle turn in a first plane;

(b) detecting a second directional component of the E-vector of the electromagnetic field corresponding to a Yakubovich angle turn in a second plane having a different angle of polarization from the first plane; and (c) comparing the first directional component to the second directional component to determine a difference between the phases, whereby the sign of the difference between the phases corresponds to the direction of angular velocity of the object.

17. The method of claim 14 wherein the step of measuring a phase further comprises measuring a difference of phases between left hand and right hand circularly polarized components of the E-vector, whereby the sign of the difference of phases corresponds to the direction of angular velocity of the object.

18. An angular velocity sensor comprising:

(a) a resonator having a propagation axis substantially parallel to the rotation axis of the angular velocity sensor;

(b) an active gain medium contained within the resonator for generating an electromagnetic beam that propagates through the medium along the propagation axis; and (c) detection means optically coupled to the resonator and responsive to the electromagnetic beam for detecting a field component of the electromagnetic beam, the field component being indicative of the angular velocity of the sensor.

19. The angular velocity sensor of claim 18 wherein the resonator and medium allow for a rotation of a polarization ellipse of an E-vector of the electromagnetic beam about the propagation axis.

20. The angular velocity sensor of claim 19 wherein the detection means comprises means for detecting a Yakubovich frequency of rotation of the polarization ellipse of the E-vector about the propagation axis, the Yakubovich frequency corresponding to an angular velocity of the sensor around the propagation axis.

21. The angular velocity sensor of claim 20 wherein the detection means further comprises polarization means for screening at least one polarization plane of the E-vector of the electromagnetic beam, the polarization means being optically coupled to the resonator.

22. The angular velocity sensor of claim 21 wherein the detection means further comprises frequency analyzation means for producing a signal corresponding to the value of the angular velocity of the sensor.

23. The angular velocity sensor of claim 20 wherein the detection means further comprises:

(a) beam splitting means optically coupled to the resonator for splitting the electromagnetic beam into first and second beams;

(b) first and second absorption means optically coupled to the beam splitting means for absorbing and detecting a left hand circularly polarized component of the first beam and detecting a right hand circularly polarized component of the second beam;

(c) comparison means optically coupled to the first and second absorption means for comparing the left hand circularly polarized component of the first beam to the right hand circularly polarized component of the second beam, thereby producing a signal corresponding to a Yakubovich frequency; and (d) output means electrically coupled to the comparison means for outputting information corresponding to the angular velocity of the sensor.

24. The angular velocity sensor of claim 23 wherein the output means comprises frequency analyzation means for producing a signal corresponding to the value of the angular velocity of the sensor.

25. The angular velocity sensor of claim 18 further comprising magnetic shield means surrounding the resonator for shielding the resonator from external magnetic fields.

26. The angular velocity sensor of claim 19 wherein the detection means further comprises:

(a) beam splitting means optically coupled to the resonator for splitting the electromagnetic beam into first and second beams;

(b) first and second polarization means optically coupled to the beam splitting means for screening a first and second polarization plane of the E-vector of the first and second beams, the first and second polarization planes having different angles of polarization;

(c) first and second detectors optically coupled to the first and second polarization means for detecting the intensity modulation of the first and second beams and for producing first and second signals having a frequency corresponding to the Yakubovich frequency; and (d) output means electrically coupled to the first and second detectors for outputting information corresponding to the angular velocity of the sensor.

27. The angular velocity sensor of claim 26 wherein the output means comprises frequency analyzation means for producing a signal corresponding to the value of the angular velocity of the sensor.

28. The angular velocity sensor of claim 26 wherein the output means comprises difference means for comparing the first signal to the second signal to determine at least a sign of a difference between phases, and for producing a signal corresponding to the sign of the difference between phases, whereby the sign of the difference between phases corresponds to the direction of angular velocity of the sensor.

29. The angular velocity sensor of claim 18 further comprising magnetic field induction means for inducing a magnetic field within the resonator, the magnetic field induction means being positioned proximate the resonator such that the magnetic field is substantially aligned along the propagation axis.

30. The angular velocity sensor of claim 29 wherein the magnetic field induction means comprises at least one permanent magnet.

31. The angular velocity sensor of claim 30 wherein the detection means further comprises frequency analyzation means for producing a signal corresponding to the value of the angular velocity of the sensor.

32. The angular velocity sensor of claim 29 wherein the magnetic field induction means comprises:

(a) a solenoid for inducing a magnetic field; and (b) receive means electrically coupled to the solenoid for receiving and providing electric current to the solenoid.

33. The angular velocity sensor of claim 32 wherein the detection means further comprises frequency analyzation means for producing a signal corresponding to the value of the angular velocity of the sensor.

34. The angular velocity sensor of claim 33 wherein the detection means further comprises synchronization means electrically coupled to the receive means, and wherein the receive means comprises means for receiving an alternating current and for generating a synchronization signal, such that the frequency analyzation means analyzes the Yakubovich frequency of rotation of the polarization ellipse of the E-vector about the propagation axis in synchronization with the alternating current.

35. The angular velocity sensor of claim 18 wherein the detection means comprises means for detecting an angle corresponding to a Yakubovich angle turn of the polarization ellipse of the E-vector about the propagation axis, the angle turn corresponding to an angular velocity of the sensor.

36. The angular velocity sensor of claim 35 wherein the detection means further comprises polarization means for screening at least one polarization plane of the E-vector of the electromagnetic beam, the polarization means being optically coupled to the resonator.

37. The angular velocity sensor of claim 36 wherein the detection means further comprises phase analyzation means for producing a signal corresponding to the value of the angular velocity of the sensor.

38. The angular velocity sensor of claim 35 wherein the detection means further comprises:
 (a) beam splitting means optically coupled to the resonator for splitting the electromagnetic beam into first and second beams;
 (b) first and second polarization means optically coupled to the beam splitting means for screening a first and second polarization plane of the E-vector of the first and second beams, the first and second polarization planes having different angles of polarization;
 (c) first and second detectors optically coupled to the first and second polarization means for detecting the intensity modulation of the first and second beams and for producing first and second signals having a phase corresponding to the Yakubovich angle turn; and
 (d) output means electrically connected to the first and second detectors for outputting information corresponding to the angular velocity of the sensor.

39. The angular velocity sensor of claim 38 wherein the output means comprises phase analyzation means for producing a signal corresponding to the value of the angular velocity of the sensor.

40. The angular velocity sensor of claim 38 wherein the output means comprises difference means for comparing the first signal to the second signal to determine at least a sign of a difference between phases, and for producing a signal corresponding to the sign of the difference between phases, whereby the sign of the difference between phases corresponds to the direction of angular velocity of the sensor.

\* \* \* \* \*